April 6, 1965 N. T. ANTON 3,176,436
ELECTRIC BELT SANDER
Filed Jan. 22, 1962 2 Sheets-Sheet 1
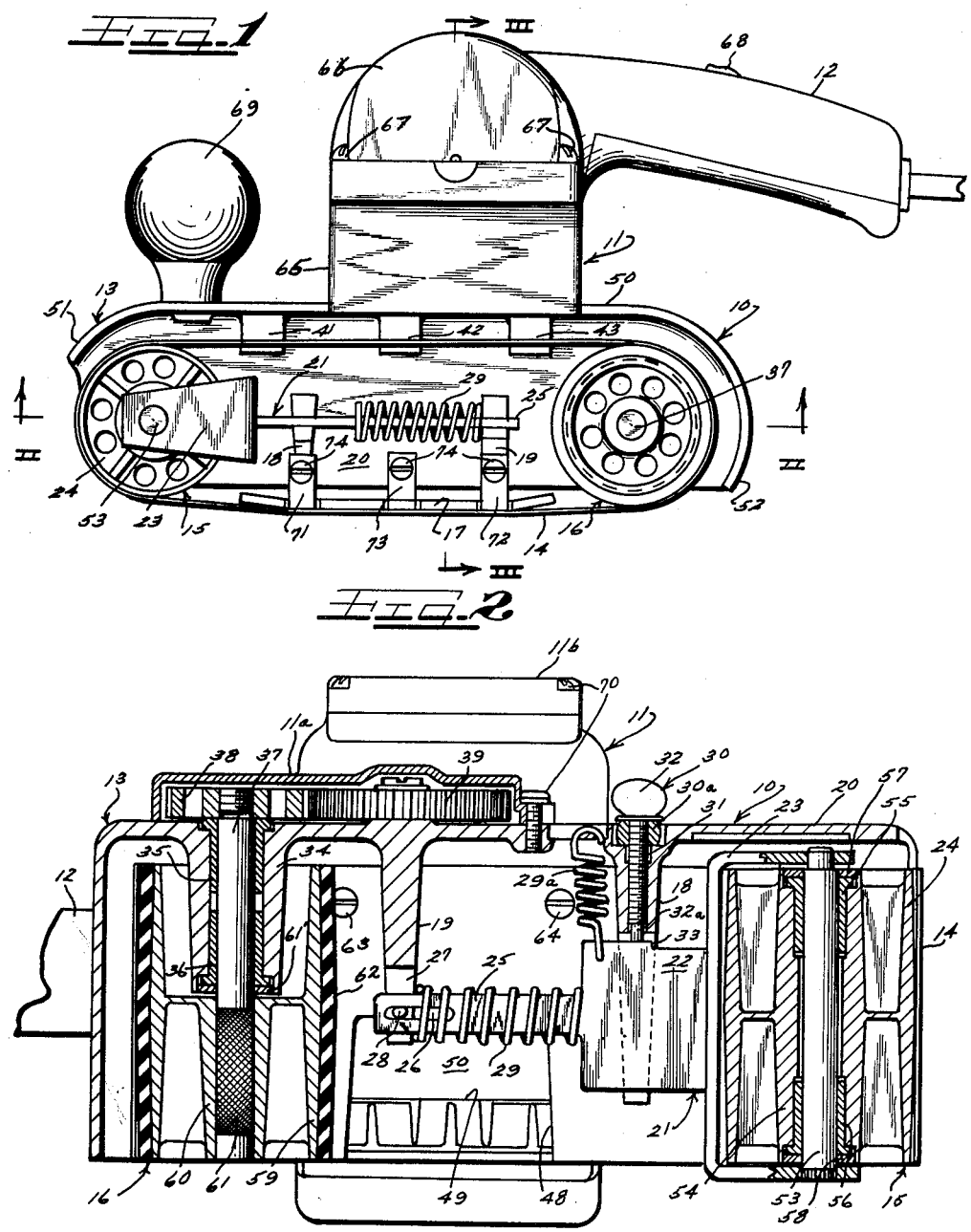
INVENTOR.
NICHOLAS T. ANTON
BY
ATTORNEYS April 6, 1965  N. T. ANTON  3,176,436
ELECTRIC BELT SANDER
Filed Jan. 22, 1962  2 Sheets-Sheet 2
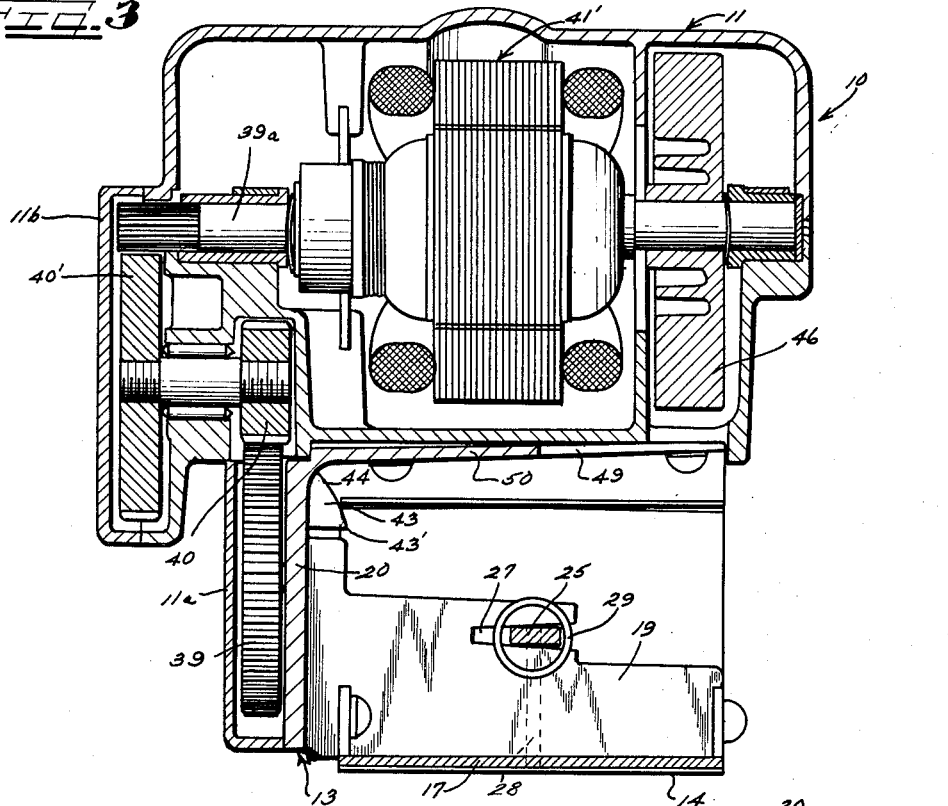
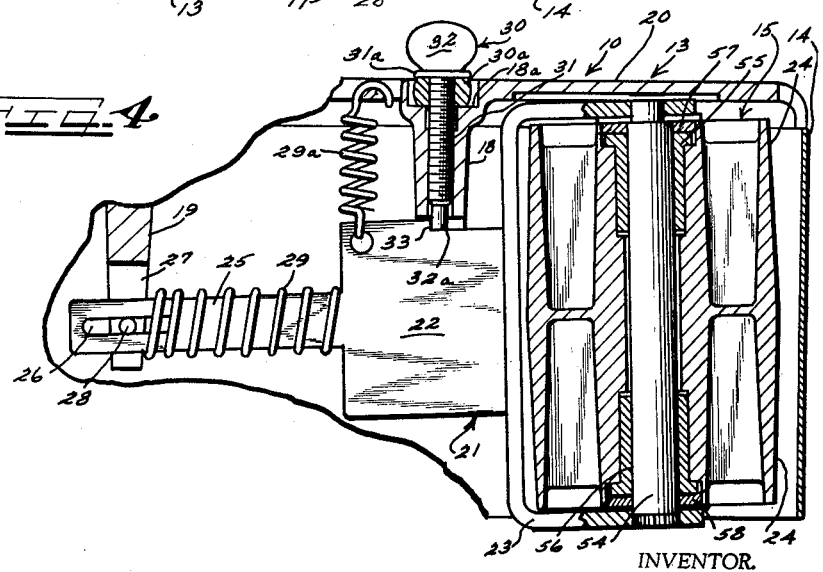
INVENTOR.
NICHOLAS T. ANTON
BY
ATTORNEYS United States Patent Office 3,176,436
Patented Apr. 6, 1965

3,176,436
ELECTRIC BELT SANDER
Nicholas T. Anton, Park Ridge, Ill., assignor to Wen Products, Inc., Chicago, Ill., a corporation of Illinois
Filed Jan. 22, 1962, Ser. No. 167,530
15 Claims. (Cl. 51—170)

This invention relates to an improved belt sander whose belt can be accurately centered and maintained in proper tracking position, and can be removed and replaced as desired.

The sander of the present invention is characterized by a rugged construction utilizing a minimum of parts and having an enhanced efficiency as the result of a forward and downwardly directed belt housing. Thus a fan in the motor housing directs air onto the upper belt run, and forwardly and downwardly as guided by the belt housing, to greatly extend the life of the belt and to provide a virtually dust free operation.

Further in accordance with the invention, a yoke construction is provided for the idler pulley for the belt, which has a tail portion defining an axial lost motion slot receiving a pin. The pin is disposed through a slot in the belt housing casting so that a high degree of accuracy in operation is afforded.

The yoke is biased toward a side wall of the casting by a spring element and adjustment of the yoke plate is provided by a threaded pin extending outwardly of the side wall and having an end stop engaging the side of a plate on the yoke. The threaded pin is of a fine adjustment characteristic providing a vernier type adjustment of the position of the yoke, and hence of the idler and belt, so that accurate centering of the belt is afforded.

In accordance with the invention, the tail of the yoke is surrounded by a compression spring of helical configuration which urges the yoke and idler forwardly to belt holding position. Rearwardly directed manual axial force on the idler arm serves to compress the helical spring and moves the yoke plate so that a shoulder thereon is moved past the stop portion of the threaded pin, whereby the stop portion engages the shoulder to lock the idler in retracted position and to permit release and replacement of the belt.

To maintain the accurate positioning of the belt afforded by the vernier type bolt and yoke means described, the invention provides integrally cast camming bosses of arcuate configuration in one side of the belt housing, such that when the belt is moved laterally thereagainst in use, it is automatically cammed back into centered position.

The yoke tail cooperatively provides a pivot point for this adjustment and thus prevents indiscriminate movement of the yoke plate assembly which would defeat the accurate alignment afforded by the threaded bolt and coacting bosses. To this end, the tail extends into a slot cast in the frame to assure a high accuracy of adjustment and stability for the yoke and belt.

Accordingly, it is an object of the present invention to provide a belt sander having unusually accurate belt-centering means.

Another object of the invention is to provide a belt sander as described affording a pivotally mounted yoke wherein the pivot point is centrally located on an integrally cast frame to the rear of the idler yoke for the idler pulley.

Another object of the invention is to provide a device as described wherein adjustment of centering of the belt is produced by a threaded bolt having a vernier type fine adjustment to engage a side of a pivotally mounted yoke carrying the idler pulley.

Another object of the invention is to provide a device as described wherein the bolt also acts as a stop so that manual pressure on the idler pulley can move the idler pulley rearwardly so as to permit a shoulder on the yoke to engage the stop, thus maintaining the idler pulley in retracted position to permit release and replacement of the belt.

Another object of the invention is to provide a device as described which has means in the form of integrally cast camming elements in the belt housing to maintain the accurate centering of the belt, and prevent the belt from damaging the casting of the housing.

Another object of the invention is to provide a unique belt tensioning means which not only permits changing the belt in a few seconds, but also maintains proper belt tension in use.

Another object of the invention is to provide a belt having casting construction which directs forced ventilation for motor cooling over both the sanding belt and the work, so as to keep these areas clean and free of dust, and to speed up sanding and extend belt life.

Other objects and advantages of the invention will become apparent as the description proceeds in accordance with the drawings in which:

FIGURE 1 is a side elevational view of a belt sander according to the present invention;

FIGURE 2 is a horizontal sectional view, partly broken away, taken along lines II—II of FIGURE 1;

FIGURE 3 is a vertical sectional view taken along the lines III—III of FIGURE 1; and FIGURE 4 is an enlarged fragmentary horizontal sectional view, substantially corresponding to the view of FIGURE 2, but disclosing the idler pulley in retracted position.

Referring now to the drawings, a belt sander 10 is shown in accordance with the present invention which includes a motor housing 11 with an integral handle 12, a belt housing 13 for a belt 14, and front and rear idler and drive pulley assemblies 15 and 16 for the belt. A backing plate or platen 17 is mounted on the housing 13 by means of front and rear lateral support bosses 18 and 19 and formed integrally with a side wall 20 of the housing 13. The front idler pulley assembly 15 is mounted for adjustable centering of the belt 14 by means of a yoke assembly 21 including a stop plate 22 carrying a yoke 23 in which the front idler pulley 24 is journaled, and a tail portion 25 integral and coplanar with the plate 22 and defining an axial lost motion slot 26 at the rear end thereof as shown in FIGURE 2.

In order to mount the yoke plate 21 for stable, pivotal movement about a point adjacent the rear end thereof, the transverse boss 19 defines a horizontal end slot 27 with the centering pivot pin 28 disposed vertically therein and extending through the slot 26 to provide an accurately based pivot point. Further to this end, and to urge the yoke plate assembly 21 outwardly to bias the idler pulley assembly against the belt in centering relation, a helical spring 29 is disposed in surrounding relation to the tail portion 25 and bears against the plate 22 and against the transverse boss 19.

Further to assist in positioning a yoke plate 21 in stabilized belt centering provision, a spring 29a is secured to the side of the plate adjacent the wall 20 and also to the said wall 20 to exert tension force on the yoke plate.

In accordance with the invention, an adjustment bolt 30 is provided having a threaded shank 31, whose threads are of a vernier-type fineness, which is threadedly received in the boss 18. The adjustment bolt 30 also is characterized by a handle 32 which extends outwardly of the housing 13 and the wall 20 for manual engagement and adjustment as required. The inner end of the said adjustment bolt has a stop portion 32a which is relatively smooth in a preferred form, and cooperates with the lost motion slot 26, the spring 29, the pin 28 and the spring 29a so that when the idler assembly 15 is moved rearwardly by suitable force exerted manually or otherwise thereon as afforded by the lost motion slot 26, the stop end 32a will engage in back of a shoulder 33 formed on the side of the plate 22 adjacent the bolt means 30 and intermediate the front and rear ends of the plate, the spring 29a being effective to pull the plate toward the wall 20 for this purpose.

In order to maintain the bolt means 30 in a desired position of adjustment, a rubber grommet or the like 30a having an inner diameter normally smaller than the shaft 31 is positioned on the outer end of the shaft or shank and is urged against the inner wall of the recess 18a by a washer 31a which engages the handle of the bolt. The resistance to rotation of the grommet afforded by this engagement with the wall of the recess is effectively transmitted to the shank so that the fine adjustment is maintained.

An advantageous feature of the invention is that the belt housing, platen support and pulley journaling means may all be cast integrally. Thus it will be seen that a hub 34 for the drive pulley assembly 16 is cast integrally with the wall 20 to receive bearings 35 and 36 therein for a pulley drive shaft 37. The shaft 37 is driven by a gear 38 as actuated by an intermediate gear 39 journaled in the wall 20 for actuation by gear means in the motor housing 11, such as gears 40 and 40'. The gear 40' is driven by the shaft 39a of the motor 41' as will be understood by those skilled in the art.

In order to maintain the desired centered tracking position for the belt 14, a plurality of arcuate centering cams, indicated at 41, 42 and 43, also are cast integrally with the housing 13 and the wall 20. As best seen in FIGURE 3, these cams may have a horizontally cross-sectional arcuate or semi-circular configuration and slope upwardly from the base portions 43' thereof to the top ends 44 thereof. Further, the camming elements 41 through 43 prevent the belt 14 from damaging the casting and the wall 20. The absence of a wall on the opposite side is an advantageous feature affording a desirable savings of material. It will therefore be seen that if the belt 14 is inadvertently or otherwise moved too far toward the wall 20, cams 41–43 will automatically and gently urge the belt in the opposite direction toward the open side of the housing 13.

Further in accordance with the invention, means are provided integrally cast with the said housing 13 for effecting a substantially dustless operation for the belt sander and for preventing excessive material from collecting on the belt, thereby also substantially increasing the life of the belt. To this end a blower fan 46 is mounted in the housing 11 as driven by the motor 41', as seen in FIGURE 3. Thus, referring to FIGURE 2, the belt housing 13 has a recess 48 in register with a recess 49 in the motor housing, and in register with the fan 46. The axis of the fan is perpendicular to the axis of the belt 14, and the width of the opening or recess 48 is sufficient to direct a powerful air flow over both the sanding belt and the work, thereby keeping both the belt and the work clean and free of dust. It will be appreciated that this action speeds up sanding operations and extends belt life. In other words, the air flow extends outwardly in each direction along the belt axially and also inwardly to the wall 20 as afforded by the opening 48. At the same time, the fan cools the motor.

In order to keep the work clean of dust, and also to cause the dust to accumulate to the rear of the casting, the invention encompasses a unique casting design wherein the forward portion of the upper housing wall 50 for the belt is arcuately downwardly and forwardly inclined in complementary relation to the belt assembly 15 and in radially spaced relation thereto as shown at 51. Thereby, the air forced onto the belt is directed downwardly across the forward end of the belt and onto the work so that the dust is moved underneath the belt and prevented from spreading up from the work. Correspondingly, of course, any dust on the sander which is blown rearwardly by the blower is moved downwardly by the rear cover portion 52 of the top housing portion 50. Also, the blower action described enhances the speed of cutting of the belt because of the clean, dust free condition provided thereon.

Referring to the specific mounting of the pulley 24 of the drive pulley assembly 15, the yoke 23 carries a transverse bearing shaft 53 between the forwardly extending arms thereof and the core 54 of the pulley 24 is journaled thereon by bearings 55 and 56 in the core. End bearing washers 57 and 58 may also be provided.

In order to mount the drive pulley assembly 16 for driving action from the drive shaft 37, the drive pulley 59 has a hub or core 60 which is secured on a knurled or splined portion 61 of the shaft 37. The hub portion 34 journaling the shaft may have a washer 61' adjacent the core 60. In order to afford ready driving engagement of the belt 14, the pulley or sleeve 59 also has a resilient drive sleeve 62 of rubber or other suitable anti-friction material.

It will be appreciated that the spring 29 normally urges the idler assembly 15 forwardly with a belt tensioning action such as to provide the desired driving relation between the belt and drive pulley assembly 16, and to maintain the desired centering of the belt until the idler pulley is moved to the rear position for engagement of the shoulder 33 by the stop 32a.

The motor housing 11 is readily secured to the belt housing 13 by suitable bolt means 63, 64 or the like, and the motor housing may be of a two-piece construction with a lower housing portion 65 secured to an upper portion 66 by bolts 67 or the like. The handle 12 is preferably formed integrally with the upper portion 66 and carries a manually operable switch 68 which can be operated by the index finger of the left hand for example, or by the thumb of the right hand for overhead sanding.

In order to afford ready maneuvering of the sander, a knob or handle 69 may be threaded by a bolt thereon into the housing 13, and may also be disposed in the motor housing for overhead sanding, selectively.

Further, the housing 11 may have a gear cover 11a, and 11b, secured thereto by suitable bolts 70 or the like.

The unitary casting for the belt housing 13 permits formation of the recentering and protective cam bosses 41 through 43 at little or no expense and it will be noted also that the positioning of the platen or belt plate 17 in the housing 13 is also execptionally simple. Thus upstanding lugs 71, 72 thereon may be secured to the ends of the respective idler bosses 18 and 19, with a lug 73 engaging the side wall 20. These lugs may be secured by screws or the like 74.

There has thus been provided a belt sander whose belt may be accurately centered by means of a yoke plate for the idler pulley thereof, pivotally mounted at a tail portion and adjustable by a vernier-like bolt. The adjustment bolt further acts as a stop to permit ready retraction of the idler pulley for removal and replacement of the belt as desired. The pivotal mounting for the tail portion of the yoke provides accuracy and stability, since the slot for the tail portion is cast into the belt housing frame itself and prevents floating of the tail end. However, the tail end portion affords a lost motion action by virtue of a lost motion slot cooperating the pivot pin in the housing slot, so as to afford the described retraction of the idler pulley. Retraction is normally resisted by a helical spring on this tail portion which also acts to provide dynamically balanced tensioning of the belt in the operating position of the idler pulley, this spring acting against the yoke plate and against the frame portion defining the slot for the tail of the yoke plate for this purpose.

The effective action of the belt thus provided is enhanced by the fan and the belt cleansing action thereof as well as by the dust control afforded by the shape of the belt housing. Again, the lugs or cam elements on the side of the belt housing maintain the centered alignment of the belt while preventing abrasion of the housing.

Thus, an exceptionally economical casting construction has been provided which performs multiple functions, all to the end of a more efficient sanding operation and more accurate control of the position of the belt and its capability for sanding.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. In a belt sander, a unitary belt housing having a top wall and a side wall, an idler pulley assembly, a drive pulley assembly, an abrasive belt driven by said drive pulley assembly, a pair of transversely extending bosses formed integrally with the side wall, a yoke plate assembly supporting said idler pulley assembly and including a plate portion and a tail portion, one of the bosses having a slot receiving the plate portion and affording tranvserse movement thereof and the other of the bosses having a slot and pin pivoting the tail portion while maintaining the tail portion against transverse movement, spring means bearing on the other of said bosses and urging the plate portion and idler assembly in the directions of the idler assembly and into belt tensioning position, said tail portion having an axial lost motion slot receiving said pin to afford relative axial movement of the yoke assembly, a belt platen carried by said bosses and the housing for a belt on said idler and drive pulley assemblies, cam means formed integrally with the belt housing for urging the belt away from the side wall and into centered position on said idler and drive pulley assemblies, a motor housing on the belt housing, and a fan in the motor housing, said motor housing and belt housing having openings for the fan to direct the air therefrom onto the upper reach of the belt, said belt housing having a forwardly and downwardly turned portion around the idler pulley assembly and spaced radially thereto to afford direct flow of air current downwardly beneath the lower reach of the belt, with the fan being effective to clean materials from the belt.

2. A belt sander comprising a belt housing, a drive pulley, an idler pulley, an abrasive belt trained over said pulleys, means journaling the drive pulley on the belt housing, means on the belt housing for driving the drive pulley, a yoke assembly journaling the idler pulley, a pivot pin on the belt housing, said yoke assembly having a slotted tail engaging said pivot pin and pivotally mounting the yoke assembly for movement about the pivot point of said pivot pin spaced axially rearwardly from the idler pulley, said pin and slot connection affording axial movement of the yoke assembly while preventing lateral movement at the pivot point and means urging the yoke assembly in the direction of the idler pulley to provide belt tensioning.

3. A belt sander comprising a belt housing, a drive pulley, an idler pulley, an abrasive belt trained over said pulleys, means journaling the drive pulley on the belt housing, means on the belt housing for driving the drive pulley, a yoke assembly journaling the idler pullye, a pivot pin on the belt housing for pivotally mounting the yoke assembly for movement about said pivot pin spaced axially rearwardly from the idler pulley, said yoke assembly having a tail portion longitudinally slotted to receive said pivot pin and affording axial movement of the yoke assembly while preventing lateral movement at said pivot pin and means urging the yoke assembly in the direction of the idler pulley to provide belt tensioning, said yoke assembly having means urging the yoke assembly and idler pulley pivotally toward said side wall of the belt housing.

4. A belt sander comprising a belt housing, a drive pulley, an idler pulley, an abrasive belt trained over said pulleys, means journaling the drive pulley on the belt housing, means on the belt housing for driving the drive pulley, a yoke assembly journaling the idler pulley, a pivot pin on the belt housing for pivotally mounting the yoke assembly for movement about a pivot point spaced axially rearwardly from the idler pulley, said yoke assembly having a tail portion slotted to receive said pivot pin and affording axial movement of the yoke assembly while preventing lateral movement at the pivot point and means urging the yoke assembly in the direction of the idler pulley to provide belt tensioning, said yoke assembly having means urging the yoke assembly and idler pulley pivotally toward said side wall of the belt housing and boss means integral with said bell housing and having cam surfaces urging said belt on the pulleys toward centered position from said side wall of said belt housing in response to movement of the belt toward said side wall from centered position.

5. A belt sander comprising a belt housing, a drive pulley, an idler pulley, an abrasive belt on said pulleys, means journaling the drive pulley on the belt housing, means on the belt housing for driving the drive pulley, a yoke plate assembly having bifurcated arms journaling the idler pulley, a plate portion and an axially extending tail portion, means on the belt housing supporting a pivot pin, said tail portion having an axially extending lost motion slot affording pivotal movement of the yoke assembly and the idler pulley about the pin without lateral motion of the tail portion at the pin, and spring means bearing against said plate portion and the means supporting the pivot pin to urge the yoke assembly and the idler pulley forwardly away from drive pulley to provide a belt tensioning action.

6. A belt sander comprising a belt housing, a drive pulley, an idler pulley, an abrasive belt on said pulleys, means journaling the drive pulley on the belt housing, means on the belt housing for driving the drive pulley, a yoke plate assembly having bifurcated arms journaling the idler pulley, a plate portion and an axially extending tail portion, means on the belt housing supporting a pivot pin, said tail portion having an axially extending lost motion slot affording pivotal movement of the yoke assembly and the idler pulley about the pin without lateral motion of the tail portion at the pin, spring means bearing against said plate portion and the means supporting the pivot pin to urge the yoke assembly and the idler pulley forwardly away from drive pulley to provide a belt tensioning action and means on the yoke plate assembly urging the yoke plate assembly toward one side of the belt housing.

7. A belt sander comprising a belt housing, a drive pulley, an idler pulley, an abrasive belt on said pulleys, means journaling the drive pulley on the belt housing, means on the belt housing for driving the drive pulley, a yoke plate assembly having bifurcated arms journaling the idler pulley, a plate portion and an axially extending tail portion, means on the belt housing supporting a pivot pin, said tail portion having an axially extending lost motion slot affording pivotal movement of the yoke assembly and the idler pulley about the pin without lateral motion of the tail portion at the pin, spring means bearing against said plate portion and the means supporting the pivot pin to urge the yoke assembly and the idler pulley forwardly away from drive pulley to provide a belt tensioning action means on the yoke plate assembly urging the yoke plate assembly toward one side of the belt housing, and a bolt threaded into said one side of said belt housing having an end portion in contact with said plate portion of said yoke plate assembly for adjustment of the angular position of the yoke plate assembly and of the tracking position of the belt.

8. A belt sander as defined in claim 7, said bolt having vernier-type threading for vernier-type adjustment of the yoke plate assembly and correspondingly sensitive adjustment of the tracking of the belt.

9. A belt sander comprising a belt housing, a drive pulley, an idler pulley, an abrasive belt and said pulleys, means journaling the drive pulley on the belt housing, means on the belt housing for driving the drive pulley, a yoke plate assembly having bifurcated arms journaling the idler pulley, a plate portion and an axially extending tail portion, means on the belt housing supporting a pivot pin, said tail portion having an axially extending lost motion slot affording pivotal movement of the yoke assembly and the idler pulley about the pin without lateral motion of the tail portion at the pin, spring means bearing against said plate portion and the means supporting the pivot pin to urge the yoke assembly and the idler pulley forwardly away from drive pulley to provide a belt tensioning action means on the yoke plate assembly urging the yoke plate assembly toward one side of the belt housing, and a bolt threaded into said one side of said belt housing having an end portion in contact with said plate portion of said yoke plate assembly for adjustment of the angular position of the yoke plate assembly and of the tracking position of the belt, said yoke plate assembly having a shoulder intermediate its ends and said end portion of said bolt providing a stop such that when the idler pulley is moved rearwardly toward the drive pulley to a predetermined extent, the end portion of the bolt engages behind the shoulder to retain the idler pulley in retracted position for ready removal and replacement of the belt.

10. A belt sander comprising a belt housing, said belt housing having a top wall and a side wall, an idler pulley, a drive pulley, an abrasive belt on said pulleys, means on the belt housing journaling the drive pulley, means on the belt housing driving the drive pulley, a pair of laterally extending bosses formed on said side wall, a lateral slot in each of said bosses, a yoke plate assembly having forward bifurcated arms journaling the idler pulley, a plate portion and a tail portion, the plate portion being transversely movable in the slot in one of said bosses and the tail portion being received in the slot of the other of the bosses, and a pin in the other of the bosses extending through the slot therein and pivoting the tail portion to afford pivotal movement of the yoke assembly and the idler pulley about the pin, with the said bosses stabilizing the mounting for the yoke plate assembly.

11. A belt sander as defined in claim 10, said side wall having integral bosses projecting towards said belt and engageable with the adjoining edge of said belt to prevent said belt from engaging and damaging said wall, said integral bosses having sloping cam surfaces formed thereon to automatically urge said belt upon engagement therewith towards the opposite side of said housing, thereby center tracking said belt.

12. A belt sander comprising a belt housing, said belt housing having a top wall and a side wall, an idler pulley, a drive pulley, an abrasive belt on said pulleys, means on the belt housing journaling the drive pulley, means on the belt housing driving the drive pulley, a pair of laterally extending bosses formed on said side wall, a lateral slot in each of said bosses, a yoke plate assembly having forward bifurcated arms journaling the idler pulley, a plate portion and a tail portion, the plate portion being transversely movable in the slot in one of said bosses and the tail portion being received in the slot of the other of the bosses, and a pin in the other of the bosses extending through the slot therein and pivoting the tail portion to afford pivotal movement of the yoke assembly and the idler pulley about the pin, with the other bosses stabilizing the mounting for the yoke plate assembly, said tail portion having a lost motion slot axially thereof to receive the pin and a spring surrounding the tail portion and bearing against the other of the bosses and against the plate portion of the yoke assembly to urge the idler pulley into belt tensioning position, the idler pulley being retractible against the force of the spring to afford ready removal and replacement of the belt.

13. A belt sander comprising a belt housing, a motor housing having a motor for driving a belt, a drive pulley, means on the belt housing journaling the drive pulley, means connecting the motor and the drive pulley for driving the drive pulley, an idler pulley, an abrasive belt on said pulleys, means journaling the idler pulley in the belt housing, and a fan driven by said motor, said motor housing and said belt housing having a common wall formed with registered openings adjacent said fan and the upper leg of the belt whereby the fan directs a stream of air outwardly in each direction axially of the belt across the upper region of the belt to cleanse the belt and extend the life of the belt.

14. A belt sander as defined in claim 13 and further characterized by said motor in said motor housing having a drive shaft disposed on a rotational axis substantially parallel to the axes of said drive pulley and said idler pulley, said means connecting said drive pulley comprising a gear train interconnecting said drive pulley at one end of said drive shaft on one side of said motor and said fan.

15. A belt sander comprising a belt housing, an abrasive belt, a motor housing having a motor for driving said belt, a drive pulley, means on the belt housing journaling the drive pulley, means connecting the motor and the drive pulley for driving the drive pulley, an idler pulley, means journaling the idler pulley in the belt housing, and a fan driven by said motor, said motor housing and said belt housing having a common wall formed with registered openings intermediate the length of the belt and adjacent the fan whereby the fan directs a stream of air across the upper region of the belt to cleanse the belt and extend the life of the belt, said belt housing having forward and rearward downwardly directed arcuate portions complementary to the idler pulley and spaced therefrom in the normal operating position of an idler pulley with the stream of air from the fan being directed outwardly in each direction axially and thereby downwardly to prevent dust from rising from the forward and rear portions of the blower.

References Cited by the Examiner

UNITED STATES PATENTS

| | | | |
|---|---|---|---|
| 445,382 | 1/91 | Sawyer. | |
| 2,000,784 | 5/35 | Myers | 51—170 |
| 2,069,502 | 2/37 | Myers | 51—170 |
| 2,272,273 | 2/42 | Parker | 51—170 |
| 2,654,190 | 10/53 | Mitchell | 51—170 |
| 2,706,367 | 4/55 | MacCarthy | 51—148 |
| 2,742,741 | 4/56 | Frostad | 51—170 |
| 3,029,568 | 4/62 | Lubas | 51—170 |

FOREIGN PATENTS

| | | |
|---|---|---|
| 602,436 | 9/34 | Germany. |

LESTER M. SWINGLE, *Primary Examiner.*

FRANK H. BRONAUGH, *Examiner.*